United States Patent
Gotfrid

(10) Patent No.: US 10,093,380 B2
(45) Date of Patent: Oct. 9, 2018

(54) METHOD AND SYSTEM FOR FOLDING A PERSONAL VEHICLE

(71) Applicant: Skyer Motors Technologies LTD, Haifa (IL)

(72) Inventor: Evgeniya Gotfrid, Haifa (IL)

(73) Assignee: Skyer Motors Technologies LTD, Haifa, IL (US)

( * ) Notice: Subject to any disclaimer, the term of this patent is extended or adjusted under 35 U.S.C. 154(b) by 367 days.

(21) Appl. No.: 14/869,770

(22) Filed: Sep. 29, 2015

(65) Prior Publication Data

US 2016/0096576 A1 Apr. 7, 2016

Related U.S. Application Data

(60) Provisional application No. 62/059,911, filed on Oct. 5, 2014.

(51) Int. Cl.
| | |
|---|---|
| *B62K 15/00* | (2006.01) |
| *F16C 11/10* | (2006.01) |
| *B62K 3/00* | (2006.01) |
| *B62B 5/06* | (2006.01) |
| *B62B 3/10* | (2006.01) |
| *B62B 1/00* | (2006.01) |

(52) U.S. Cl.
CPC ............ *B62K 15/006* (2013.01); *B62K 3/002* (2013.01); *F16C 11/10* (2013.01); *B62B 1/002* (2013.01); *B62B 3/102* (2013.01); *B62B 5/067* (2013.01)

(58) Field of Classification Search
CPC .... B62K 3/002; B62K 15/006; B62K 15/008; B62B 1/002; B62B 1/008
See application file for complete search history.

(56) References Cited

U.S. PATENT DOCUMENTS

| | | | | |
|---|---|---|---|---|
| 3,785,669 | A * | 1/1974 | Doheny | B62B 1/002 280/47.18 |
| 4,821,832 | A * | 4/1989 | Patmont | B62K 3/002 180/208 |
| 6,120,044 | A * | 9/2000 | Tsai | B62K 15/006 280/639 |
| 6,234,497 | B1 * | 5/2001 | Stahler, Sr. | B62B 1/002 280/47.29 |
| 6,308,967 | B1 * | 10/2001 | Stallbaumer | B62B 1/002 280/47.18 |

(Continued)

FOREIGN PATENT DOCUMENTS

EP 2540604 A1 1/2013

*Primary Examiner* — Emma K Frick
(74) *Attorney, Agent, or Firm* — Randall Danskin PS

(57) ABSTRACT

A folding, personal vehicle includes a frame having a foot deck, a front wheel, a bracket, and a handle. The bracket is pivotally connected to the frame and has a bottom position and a top position. The handle is connected to the bracket and is positioned at least partially elevationally above the foot deck of the frame when the bracket is in the top position and is positioned at least partially elevationally below the foot deck of the frame when the bracket is in the bottom position. A folding mechanism for a personal vehicle includes a bracket with a first bracket profile and a second bracket profile. The first bracket profile engages a rear side of a bottom rod when the bracket is in a top position. The second bracket profile engages a front side of the bottom rod when the bracket is in a bottom position.

6 Claims, 8 Drawing Sheets

(56) References Cited

U.S. PATENT DOCUMENTS

| | | | | |
|---|---|---|---|---|
| 6,328,319 B1* | 12/2001 | Stahler, Sr. | ............. | B62B 1/002 280/47.18 |
| 6,364,328 B1* | 4/2002 | Stahler, Sr. | ............. | B62B 1/002 280/47.18 |
| 6,443,470 B1 | 9/2002 | Ulrich et al. | | |
| 6,588,775 B2* | 7/2003 | Malone, Jr. | ............. | B62B 1/002 280/47.18 |
| 7,967,095 B2* | 6/2011 | Kosco | ................... | B62K 5/025 180/208 |
| 8,292,018 B2* | 10/2012 | Huang | ................... | B60B 19/00 180/220 |
| 8,801,010 B2* | 8/2014 | Deb | .......................... | B62J 7/00 224/42.11 |
| 8,876,125 B1* | 11/2014 | Chan | .................... | B62D 15/00 280/22 |
| 8,876,128 B2* | 11/2014 | Moldestad | .......... | B62K 15/008 280/278 |
| 9,027,944 B2* | 5/2015 | Johnson | ............... | B62K 15/006 280/87.041 |
| 9,211,894 B2* | 12/2015 | Gibson | .................. | B62B 1/002 |
| 9,637,149 B1* | 5/2017 | Wang | ...................... | B62B 1/002 |
| 9,758,184 B1* | 9/2017 | Vaverek | .................... | B62B 1/20 |
| 9,771,120 B2* | 9/2017 | Ku | ....................... | B62K 15/008 |
| 2006/0220334 A1* | 10/2006 | Liao | ........................ | B62B 1/002 280/47.34 |
| 2012/0119459 A1* | 5/2012 | Hanson | .................. | B62B 1/002 280/47.17 |
| 2014/0151982 A1 | 6/2014 | Ferret | | |

* cited by examiner

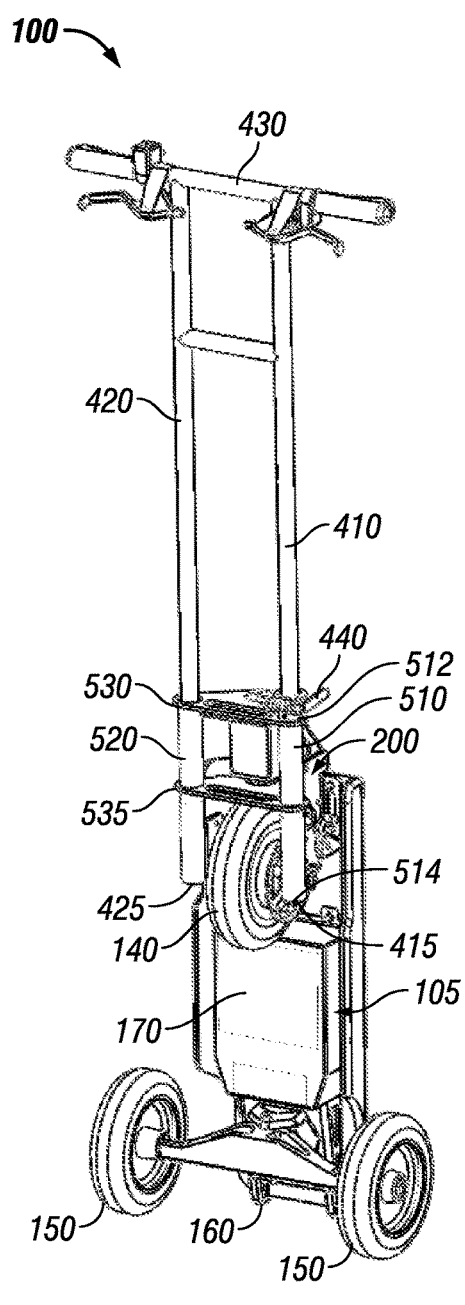
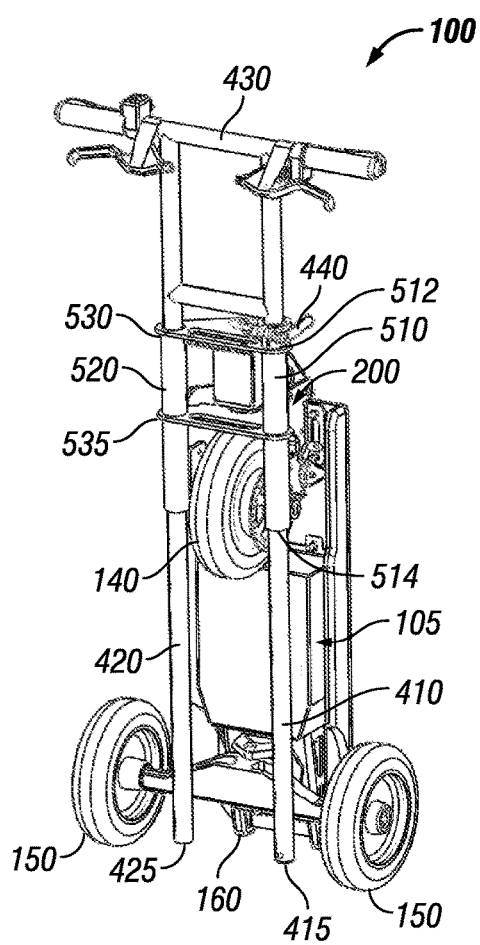
FIG. 9A
FIG. 9B

METHOD AND SYSTEM FOR FOLDING A PERSONAL VEHICLE

CROSS REFERENCE TO RELATED APPLICATIONS

The present application claims the benefit of priority under 35 U.S.C. § 119 to U.S. Provisional Application No. 62/059,911 filed Oct. 5, 2014, entitled Method and System for Folding an Electric Apparatus, the disclosure of which is hereby incorporated herein by reference in its entirety.

BACKGROUND

In recent years, electric vehicles, such as automobiles, scooters or bicycles, are using electrical power for movement. Such vehicles are quiet, powerful, and environmentally friendly as they do not emit harmful gases. Among electric vehicles used in urban areas, perhaps one of the most attractive examples for transportability is the compact electric scooter. In large cities, where traffic is very dense, these kind of personal vehicles are more comfortable for end-users in light of their speed (may be greater than the speed of the regular bicycle), comparatively smaller size than that of regular vehicles, and maneuverability in heavy traffic.

However, this kind of vehicle has disadvantages relating to transportability, especially in urban areas. One of the main problems with known electric personal vehicles such as scooters or bicycles is finding a parking space. In addition, the probability that a vehicle may be stolen is increased when it is left outside. Furthermore, such personal electric vehicles are relatively heavy and uncomfortable for handling and transporting. For example, owners of such vehicles face difficulty carrying the vehicle on stairs or fitting inside an elevator due to their large size, heaviness, and uncomfortable shape. Electric personal vehicles with ordinary structure tend to occupy a large amount of space, causing storage problems and difficulty transporting in a dense environment, such as public transportation, personal cars, and elevators.

Therefore, it would be beneficial for such vehicles to be able to be easily folded into a compact structure. Moreover, it would beneficial for a personal electric vehicle to be transported using its own wheels when in the folded configuration.

BRIEF DESCRIPTION OF THE DRAWINGS

Some embodiments are described below with reference to the following accompanying drawings.

FIG. 9A shows the folding personal vehicle of FIG. 1 with the bracket in the bottom position and the handle in an extended position.

FIG. 9B shows the folding personal vehicle of FIG. 8B resting upon its rear wheels and standoffs positioned on a rear end of the frame.

DETAILED DESCRIPTION

The present disclosure relates generally to a system and method for folding a personal vehicle, such as an electric scooter.

The unique folding system may give users increased mobility in transporting a personal vehicle because it can be folded into a dolly-like form and transported in a compact state by way of its own wheels. In the compact state, it can easily be taken into areas of high density or confined dimensions, such as offices, restaurants, and shopping centers. It can easily be placed in the trunk of a car or in an elevator due to its compact size. The vehicle may be folded in a very short time. The vehicle may be folded from a fully expanded driving position to a compact walking position in only a few seconds.

Provided herein is a method and system that may fold a personal vehicle, such as a personal electric vehicle, into a compact configuration in a short amount of time. The folding system and method increases the mobility of the vehicle and can be easily folded and transported. Among other benefits, the systems herein are of simple construction, utilize a simple folding sequence, can be folded in a short amount of time, occupy a small space in the compact configuration, and can easily be rolled on their own wheel or wheels in the compact configuration. In addition, the handle of the vehicle in the compact configuration can be adjusted to benefit users of varying heights.

According to the disclosure herein, an example of a folding, personal vehicle includes a frame having a foot deck and a front end, a front wheel positioned at the front end of the frame, a bracket pivotally connected to the front end of the frame, the bracket having a bottom position at least partially elevationally below the foot deck and a top position at least partially elevationally above the bottom position, and a handle connected to the bracket, the handle being positioned at least partially elevationally above the foot deck of the frame when the bracket is in the top position, and the handle being positioned at least partially elevationally below the foot deck of the frame when the bracket is in the bottom position.

According to the disclosure herein, an example of a folding mechanism for a personal vehicle includes a frame having a foot deck, a bottom rod, and a top rod, the bottom rod having a rear side and an opposing front side, and a bracket pivotally connected to the top rod of the frame, the bracket having a bottom position at least partially elevationally below the foot deck, a top position at least partially elevationally above the bottom position, a first bracket profile, and a second bracket profile, the first bracket profile engaging the rear side of the bottom rod of the frame when the bracket is in the top position, and the second bracket profile engaging the front side of the bottom rod of the frame when the bracket is in the bottom position.

Figure 1:
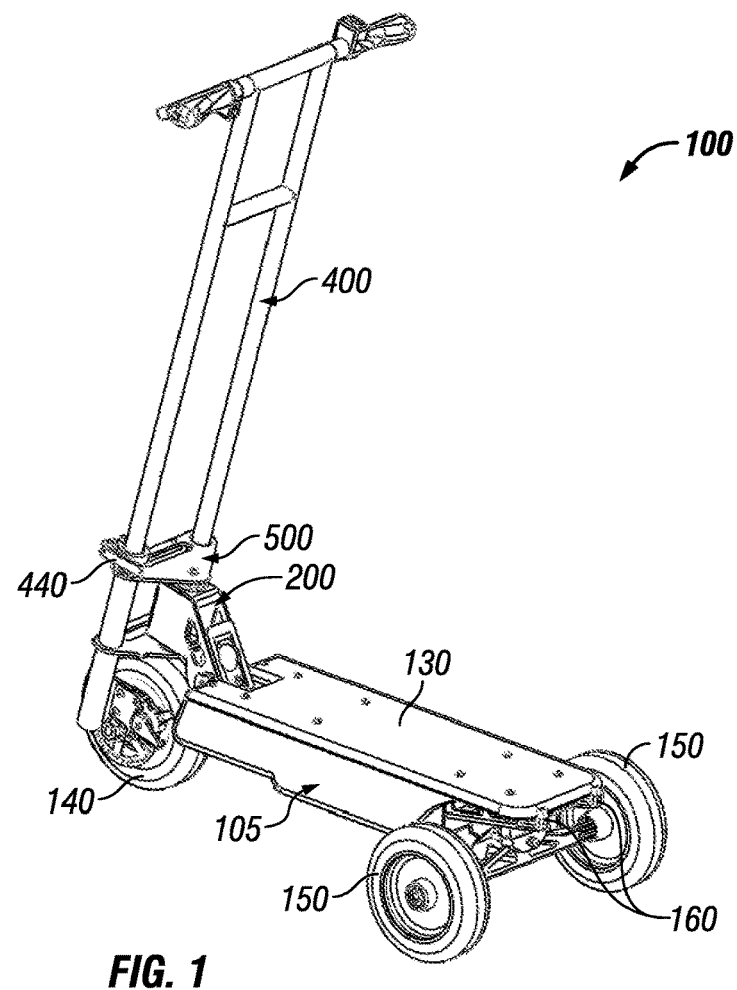
FIG. 1 shows a folding personal vehicle in a driving position. In the driving position, a bracket of the vehicle is in a top position and a handle is in an extended position.

FIG. 1 shows a folding vehicle 100 in a driving position. The folding vehicle 100 includes a frame 105, a front wheel 140, rear wheels 150, standoffs 160, a bracket 200, a handle 400, a post clamp 440, and a fork assembly 500. A motor 170 (shown in FIG. 9A), such as an electric motor, may be used to propel the vehicle 100 as may be appreciated by one of ordinary skill in the art. The handle 400 and bracket 200 are locked in a driving position, as will be explained in more detail below. In the driving position, the vehicle moves on its rear wheels 150 and front wheel 140. In FIG. 1, the folding vehicle 100 is a personal scooter having two rear wheels and a front wheel, though other configurations are conceivable. For example, the rear wheels 150 may instead be a single wheel. Also, the front wheel 140 may instead be a plurality of front wheels. The handle 400 has an expanded position and a compact position, as are more fully described below. The handle 400 includes a grip 430 (shown in FIG. 9A) positioned at the top of the handle 400. When the handle 400 is in the extended position, the grip 430 of the handle 400 is further from the fork assembly 500 than when the handle 400 is in the compact position.

Figure 2:
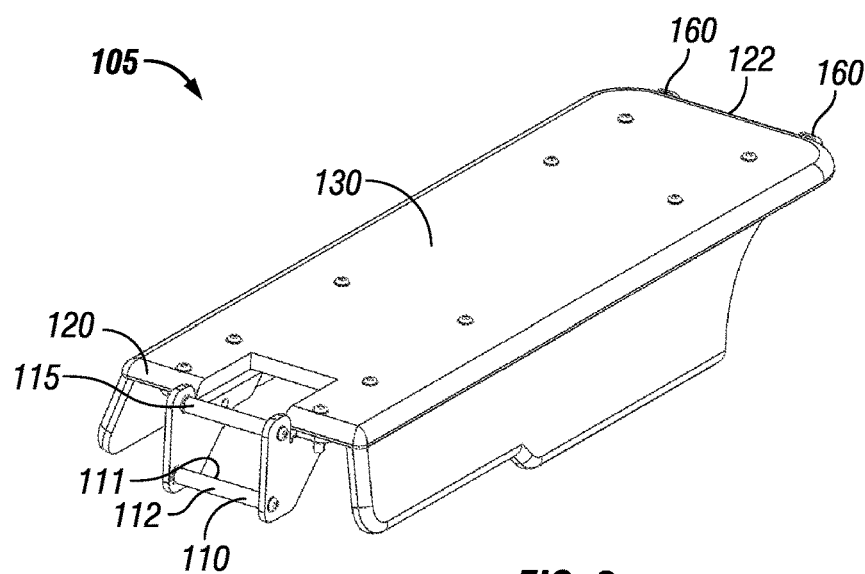
FIG. 2 shows a frame of the folding personal vehicle in FIG. 1.

FIG. 2 shows the frame 105 of the folding vehicle 100. The frame 105 includes a foot deck 130, a front end 120, a rear end 122, and standoffs 160 positioned at the rear end 122 of the frame 105. The front wheel 140 is positioned at the front end 120 of the frame 105. The rear wheels 150 may be positioned at the rear end 122 of the frame 105. The frame 105 includes a bottom rod 110 and a top rod 115 positioned at the front end 120 of the frame 105. The bottom rod 110 has a rear side 111 and an opposing front side 112.

Figure 3:
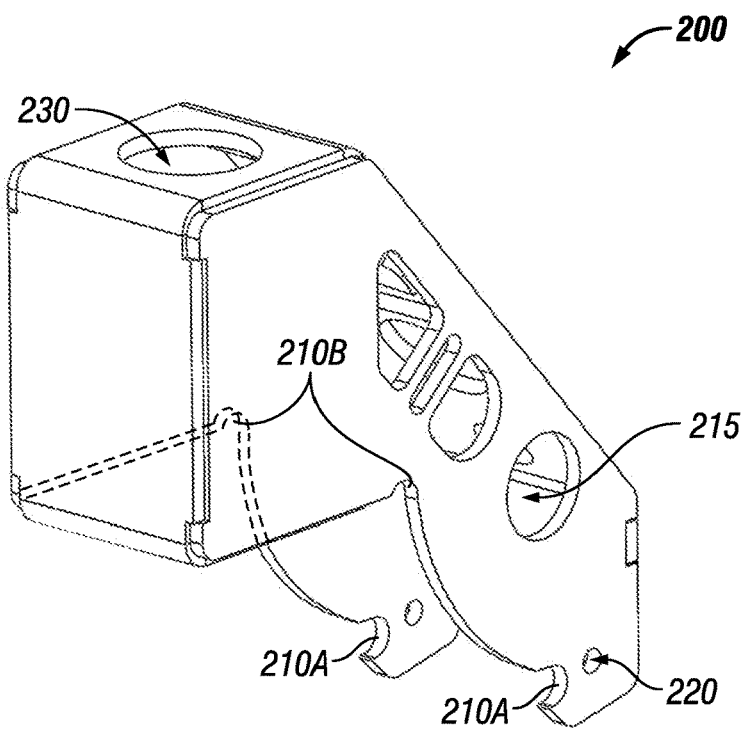
FIG. 3 shows a bracket of the folding personal vehicle in FIG. 1.
Figure 8A:
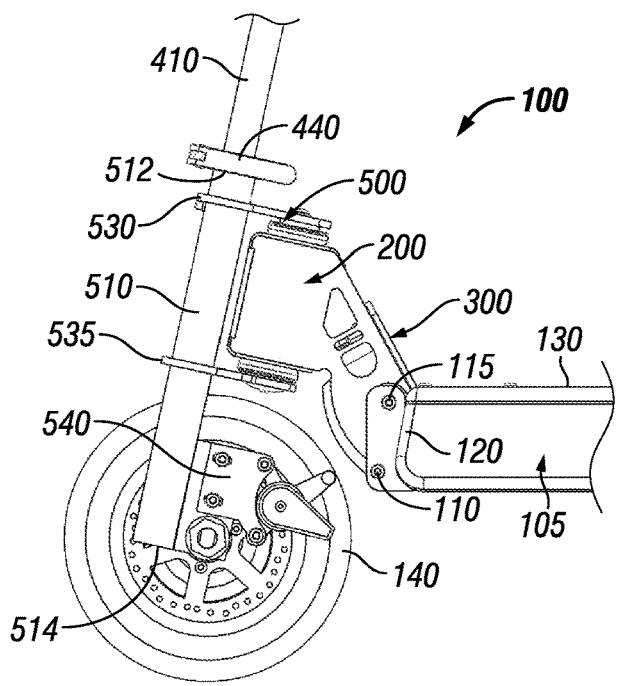
FIG. 8A shows a partial side view of the folding personal vehicle of FIG. 1 in the driving position.
Figure 8B:
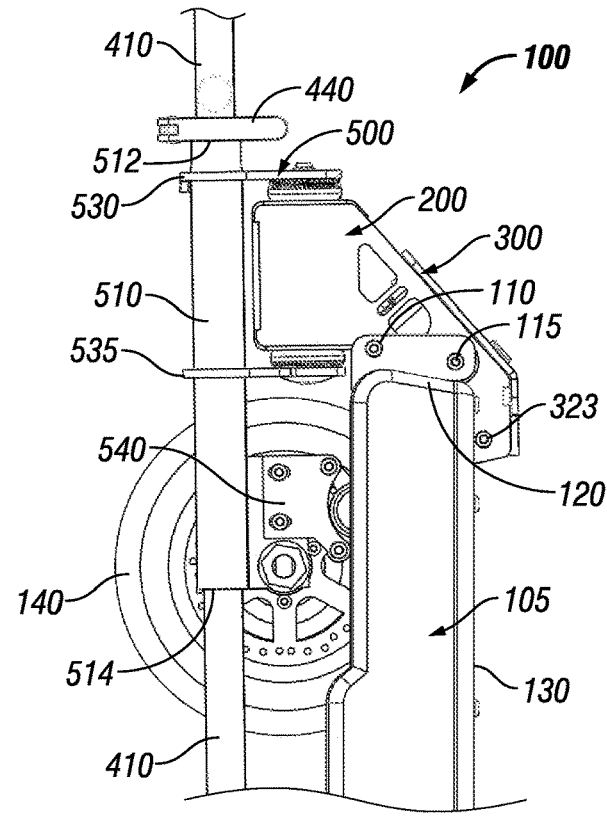
FIG. 8B shows a partial side view of the folding personal vehicle of FIG. 1 in a walking position. In the walking position, a bracket of the folding vehicle is in a bottom position and a handle is in a compact position.

FIG. 3 shows the bracket 200 of the folding vehicle 100. The bracket 200 includes a first bracket profile 210A, a second bracket profile 210B, and a bracket aperture 215. The first bracket profile 210A and the second bracket profile 210B are configured to engage the bottom rod 110 of the frame 105. The bracket aperture 215 enables the bracket 200 to be pivotally connected to the top rod 115 of the frame 105. The center of the bracket aperture 215 may be equidistant from the first bracket profile 210A and the second bracket profile 210B. The bracket 200 can be pivoted about the top rod 115 of the frame 105 between a top position (shown in FIG. 8A) and a bottom position (shown in FIG. 8B). A sleeve (not shown) or other pivoting mechanism may fit over top rod 115 and be sized to fit within bracket aperture 215. In the bottom position, the bracket 200 is at least partially elevationally below the foot deck 130. In the top position, the bracket 200 is at least partially elevationally above the bottom position of the bracket 200. When the bracket 200 is in the top position, the grip 430 of the handle 400 is positioned elevationally above the foot deck 130 of the frame 105. The term "elevationally" is used to refer to altitudes in the reference plane defined by the foot deck 130 of the personal vehicle 100.

In the top position, the bracket 200 may be oriented at a 90 degree angle from the bracket the bottom position. When the foldable vehicle 100 is in the driving position, the bracket 200 is in the top position and the handle 400 is in the extended position. When the vehicle is in the walking position, the bracket 200 is in the bottom position and the handle 400 is in the compact position. In the top position, the first bracket profile 210A engages the rear side 111 of the bottom rod 110 of the frame 105. In the bottom position, the second bracket profile 210B engages the front side 112 of the bottom rod 110 of the frame 105. The bracket 200 may include a fork connection 230 configured to connect the bracket 200 to the fork assembly 500. By way of example, the bracket 200 may connect to the fork assembly 500 through a clevis-type fastener.

Figure 4:
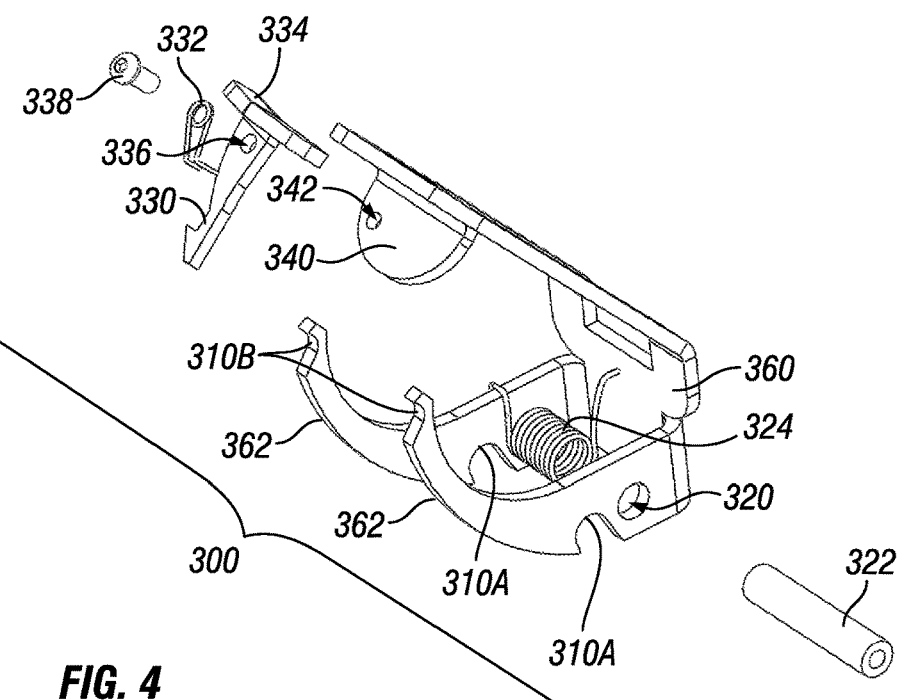
FIG. 4 shows an exploded view of a lock having a snap lock and a handle spring for biasing the lock in a closed position of the folding personal vehicle in FIG. 1.

The vehicle 100 may include a lock 300 to limit movement of the bracket 200 between the top position and the bottom position. FIG. 4 shows a lock 300. The lock 300 may be pivotally connected to the bracket 200. The lock 300 includes a rod aperture 320 and lock rod 322. The lock rod 322 extends through the rod aperture 320 and provides an axis about which the lock 300 may be pivoted. The lock rod 322 may extend through a lock aperture 220 (shown in FIG. 3) of the bracket 200 or may be secured to the bracket 200 by other means. For example, as apparent in FIGS. 6A, 6B, 7A, and 7B, the ends of the lock rod 322 may receive bolts 323 passed through the lock aperture 220.

The lock 300 may have a closed position and an open position. In the open position, the bracket 200 may be pivoted between the top position and the bottom position. In the closed position, the lock 300 limits movement of the bracket 200 with respect to the frame 105. The lock 300 may pivot about the lock rod 322 between the open position and the closed position. The lock 300 is at least partially inside the bracket 200. A portion of the lock 300 may be narrower than the bracket 200, wherein the lock 300 may be positioned within the bracket 200 and protected from outside forces, such as debris or weather.

The lock 300 includes a first lock profile 310A and a second lock profile 310B. When the lock 300 is in the closed position and the bracket 200 is in the top position, the first lock profile 310A engages the bottom rod 110 of the frame 105 (shown in FIG. 8A). The first lock profile 310A may engage the front side 112 of the bottom rod 110 of the frame 105. When the lock 300 is in the closed position and the bracket 200 is in the bottom position, the second lock profile 310B engages the bottom rod 110 of the frame 105 (shown in FIG. 8B). The second lock profile 310B may engage the rear side 111 of the bottom rod 110 of the frame 105. The lock 300 may have a handle protrusion 340 configured to be received within a snap lock opening 240 (shown in FIG. 5) of the bracket 200. The handle protrusion 340 may assist in securing the lock 300 in the closed position.

The lock 300 may include a lock handle 360 and a snap lock 330. The lock handle 360 includes a lock arm 362. The first lock profile 310A and the second lock profile 310B are positioned on the lock arm 362 of the lock handle 360. The lock handle 360 may have a plurality of lock arms 362. The lock 300 may include a handle spring 324 configured to bias the lock 300 in the closed position. The snap lock 330 is connected to the handle protrusion 340. The snap lock 330 includes an open and a closed position. The snap lock 330 may include a snap lock aperture 336 that corresponds with a handle aperture 342 in the handle protrusion 340. A snap lock pin 338 may pivotally connect the snap lock 330 to the handle protrusion 340. The snap lock 330 includes a lock lever 334 configured to move the snap lock 330 between the open position and the closed position. By way of example, the lock lever 334 may be a surface extending away from the snap lock aperture 336 such that when a force is applied to the surface of the lock lever 334, the snap lock 330 is pivoted about the snap lock pin 338. A lock spring 332 may be used to bias the snap lock 330 in the closed position.

Figure 5:
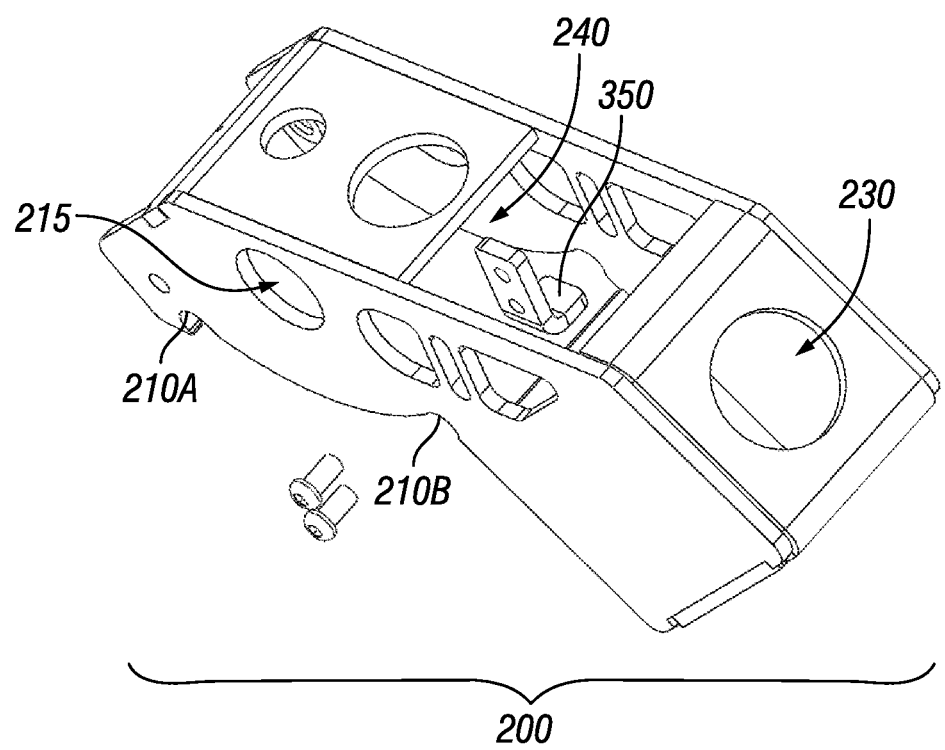
FIG. 5 shows an exploded view of a lock holder connected to an interior surface of the bracket in FIG. 3.

FIG. 5 shows a lock holder 350 connected to the bracket 200. By way of example, bolts may be used to secure the lock holder 350 to an interior surface of the bracket 200. The lock holder 350 may be connected to an interior surface of the bracket 200. The lock holder 350 engages the snap lock 330 when the snap lock 330 is in the closed position. In the closed position, the snap lock 330 limits movement of the bracket 200 with respect to the lock handle 360. In the open position, the snap lock 330 allows the lock handle 360 to be moved with respect to the bracket 200.

Figure 6A:
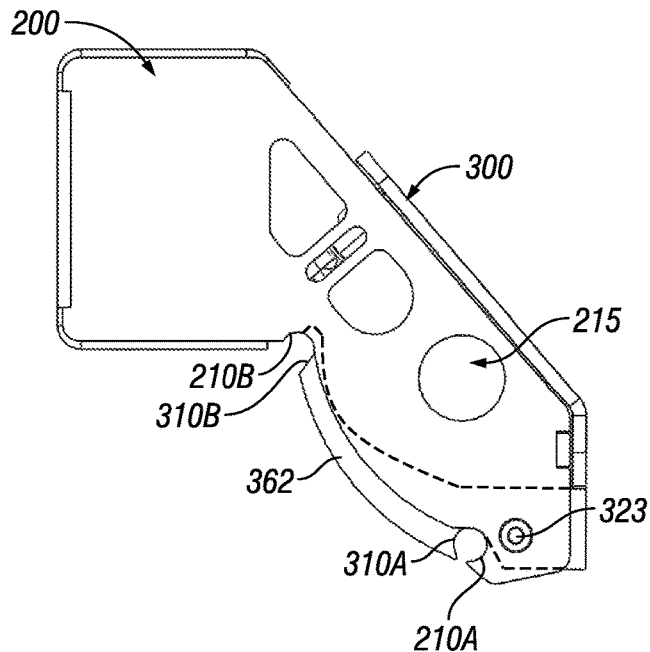
FIG. 6A shows the lock of FIG. 4 pivotally connected to the bracket of FIG. 3 with the lock in a closed position.
Figure 6B:
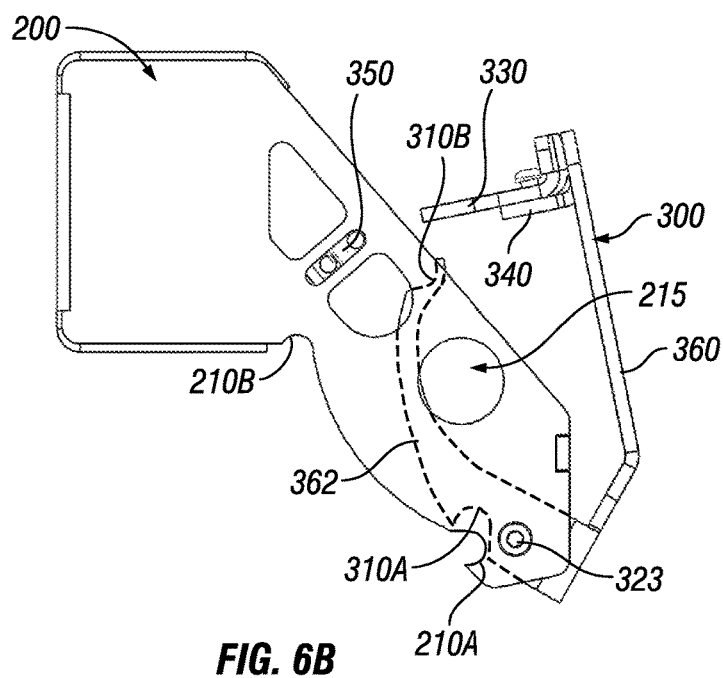
FIG. 6B shows the lock of FIG. 4 pivotally connected to the bracket of FIG. 3 with the lock in an open position.
Figure 7A:
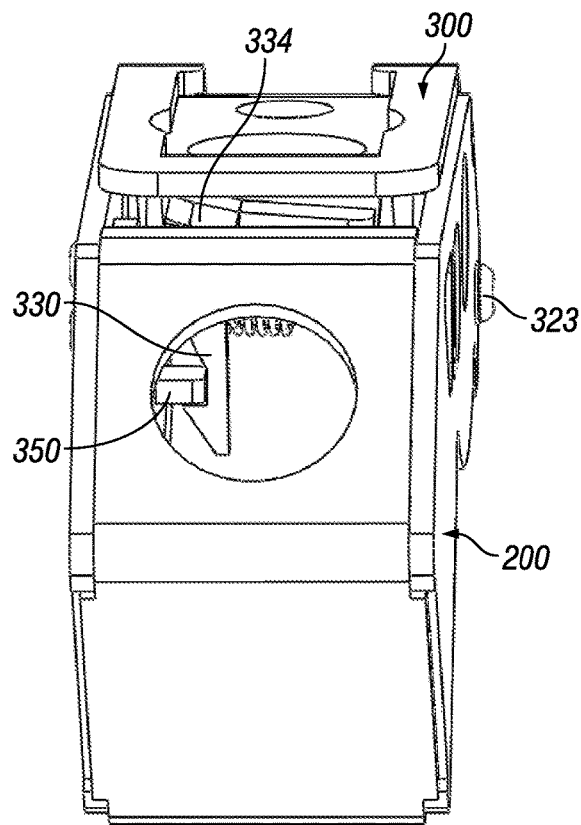
FIG. 7A shows the bracket and lock of FIG. 6A with the snap lock in a closed position.
Figure 7B:
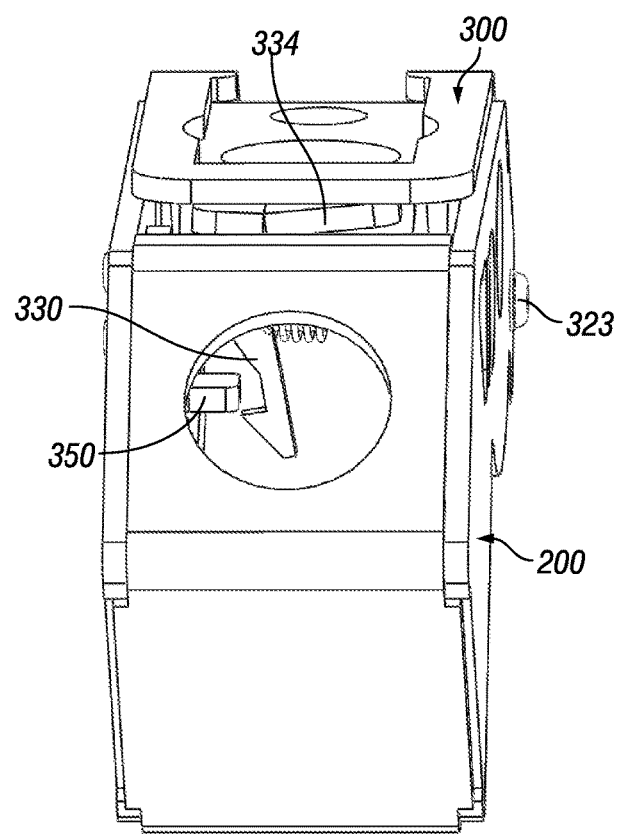
FIG. 7B shows the bracket and lock of FIG. 6A with the snap lock in an open position.

FIG. 6A shows the lock 300 connected to the bracket 200 with the lock 300 in the closed position. FIG. 6B shows the lock 300 pivoted about the lock rod 322 (shown in FIG. 4) to the open position. The lock 300 is pivotally connected to the bracket 200 by a lock rod 322. The snap lock 330 extends into the snap lock opening 240 of the bracket 200 and contacts the lock holder 350 when it is in the closed position (shown in FIG. 7A). In its closed position, the snap lock 330 limits movement of the lock 300 with respect to the bracket 200. In the lock's 300 closed position, either the first lock profile 310A or the second lock profile 310B of the lock 300 is engaged with the bottom rod 110 of the frame 105 (shown in FIG. 2) depending on whether the bracket 200 is in the top position or the bottom position. The bracket 200 may be pivoted between the top position and the bottom position when the lock 300 is in its open position. When in the closed position, the lock 300 may be placed in the open position by first placing the snap lock 330 in its open position. As explained above, a force applied to the lock lever 334 may transition the snap lock 330 from the closed position to the open position. In the open position, the snap lock 330 is not engaged with the lock holder 350 (shown in FIG. 7B). A user may then move the lock 300 from its closed position (shown in FIG. 6A) to its open position (shown in FIG. 6B) by pivoting the lock 300 about the lock rod 322. By way of example, the lock handle 360 may be used to hold the lock 300 and pivot it about the lock rod 322. With the lock 300 in the open position, the bracket 200 may be pivoted between the top position and the bottom position.

FIG. 9A shows the handle 400 in the extended position. FIG. 9B shows the handle 400 in the compact position. The handle 400 includes a first post 410, a second post 420, and a grip 430. The grip 430 connects the first post 410 to the second post 420 and may be used to steer the vehicle 100. The handle 400 may include only a first post 410 as may be appreciated by one of ordinary skill in the art having the benefit of this disclosure. A throttle and a brake may be attached to the handle 400. The fork assembly 500 includes a first tube 510 and a second tube 520. The first post 410 and the second post 420 are positioned within the first tube 510 and the second tube 520, respectively, and may slide therein. When sliding the first post 410 and second post 420 in a compacting direction, the grip 430 of the handle 400 moves towards the first tube 510 and the second tube 520. When sliding the first post 410 and the second post 420 in an expanding direction, the grip 430 of the handle 400 moves away from the first tube 510 and the second tube 520. The handle 400 may be fully adjustable between a fully extended position and a fully compact position. The first tube 510 has a first end 512 and a second end 514 (shown in FIGS. 8A, 8B). The first end 512 of the first tube 510 is closer to the grip 430 of the handle 400 than the second end 514 of the first tube 510. An end 415 of the first post 410 may terminate at the second end 514 of the first tube 510 when the handle 400 is in the extended position. The fork assembly 500 may include a first plate 530 and a second plate 535. The first plate 530 is positioned above the second plate 535. The first plate 530 and the second plate 535 may attach the fork assembly 500 to the fork connection 230 of the bracket 200. The first plate 530 and the second plate 535 may hold the first tube 510 and the second tube 520 in a position parallel to each other.

In the compact position, the end 415 of the first post 410 extends beyond the second end 514 of the first tube 510. The front wheel 140 is positioned between the first tube 510 and the second tube 520. The grip 430 of the handle 400 is positioned closer to the first end 512 of the first tube 510 than when the handle 400 is in the extended position. The end 415 of the first post 410 and an end 425 of the second post 420 extend beyond an axle of the rear wheels 150. The fork assembly 500 may include a post clamp 440 connected to the first end 512 of the first tube 510. The post clamp 440 includes an open position and a closed position. In the open position, the first post 410 may slide within the first tube 510. In the closed position, the post clamp 440 limits movement of the first post 410 with respect to the first tube 510. The fork assembly 500 may include a first wheel bracket 540 connecting the front wheel 140 to the first tube 510. The fork assembly may include a second wheel bracket (not shown) connecting the front wheel 140 to the second tube 520.

The time required to fold the vehicle 100 from the driving position (shown in FIGS. 1 and 8A) to the walking position (shown in FIGS. 8B and 9B) may take only a few seconds. The vehicle is placed on the standoffs 160 positioned on the rear end 122 of the frame 105. The snap lock 330 may be opened (shown in FIG. 7B) and the lock 300 may be placed in the open position (shown in FIG. 6B). With the lock 300 in the open position, the bracket 200 may be folded from the top position to the bottom position. As shown in FIG. 9A, with the bracket 200 in the bottom position, the front wheel 140 is elevationally below the foot deck 130 of the frame 105 and the handle 400 is at least partially elevationally below the foot deck 130 of the frame 105. The grip 430 of the handle 400 may be elevationally below the foot deck 130 of the frame 105. Once in the bottom position, the lock 300 may be returned to the closed position to limit movement of the bracket 200 with respect to the frame 105 (shown in FIG. 6A). The snap lock 330 is closed to limit movement of the lock 300 with respect to the bracket 200 (shown in FIG. 7A). In such a position, the handle 400 may still be in the extended position. The post clamp 440 may be placed in the open position and the first and second posts 410, 420 of the handle 400 may slide within the first and second tubes 510, 520 of the fork assembly 500. As shown in FIG. 9B, the grip 430 of the handle 400 is moved toward the fork assembly 500. Once in the desired position, the post clamp 440 may be closed to limit movement of the handle 400 with respect to the fork assembly 500. The grip 430 of the handle 400 may protrude beyond the front end 120 of the frame 105. With the bracket 200 in the bottom position and the handle 400 in a compact position, the personal vehicle 100 is in the walking position. In the walking position, the vehicle 100 can be easily transported. It can fit within an automobile trunk, an elevator, or any other small place that may otherwise be inaccessible in the driving position. While in the walking position, the vehicle may roll on the rear wheels 150 and may be maneuvered by using the grip 430 of the handle 400. While not in motion, the rear wheels 150 and the standoffs 160 may support the vehicle 100 in an upright position on a surface and limit the vehicle 100 from tipping over.

Once the vehicle has reach a desired destination, it may be unfolded into a driving position. The vehicle may rest on the rear wheels 150 and the standoffs 160. The post clamp 440 is placed in an open position. In the open position, the post clamp 440 allows the first and second posts 410, 420 of the handle 400 to slide within the first and second tubes 510, 520 of the fork assembly 500. A user may pull the grip 430 of the handle 400 away from the fork assembly 500 to move the handle 400 from the compact position to the extended position. Once the handle 400 has been extended into the extended position, the post clamp 440 may be placed in a closed position to limit movement of the handle 400 with respect to the fork assembly 500. The snap lock 330 may be opened and the lock 300 may be placed in the open position. With the lock 300 in the open position, the bracket 200 may be pivoted from the bottom position to the top position. In the top position, the lock 300 may be returned to the closed position to limit movement of the bracket 200 with respect to the frame 105. The snap lock 330 is closed to limit movement of the lock 300 with respect to the bracket 200. With the bracket 200 in the top position and the handle 400 in an extended position, the vehicle 100 is in the driving position.

Figure 10:
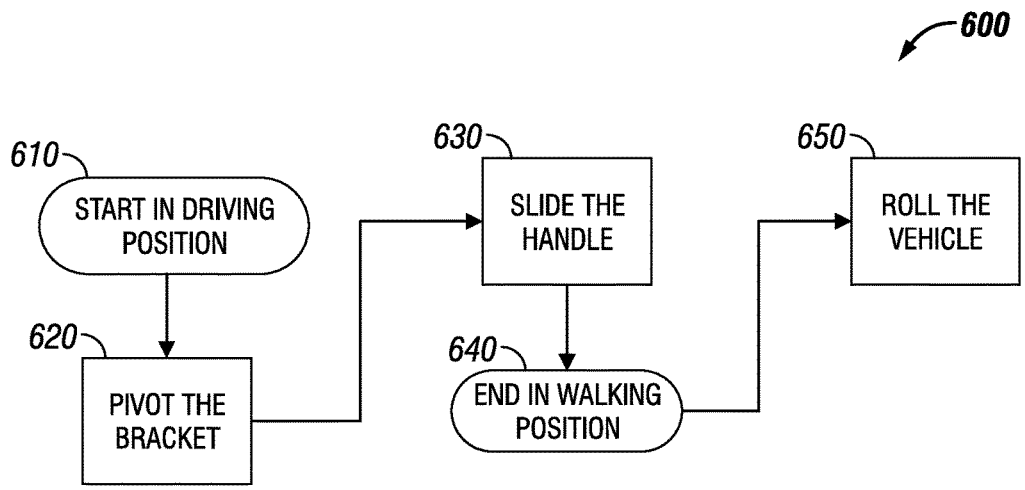
FIGS. 10 and 11 are flow diagrams showing methods for folding a personal vehicle.

FIG. 10 is a flow diagram of a method 600 for folding a vehicle. The folding starts 610 with the vehicle in a driving position. Action 620 in method 600 includes pivoting the bracket from a top position to a bottom position. Action 630 in method 600 includes sliding the handle into a compact position. The folding ends 640 with the vehicle in a walking position with the bracket in the bottom position and the handle in the compact position. In the walking position, the vehicle may be rolled on its rear wheels according to action 650. The method is reversible. Therefore, the vehicle may begin in a walking position. Action 630 may be reversed to slide the handle from the compact position into an expanded position. Action 620 may be reversed to pivot the bracket from the bottom position to the top position. The vehicle may end in the driving position.

Figure 11:
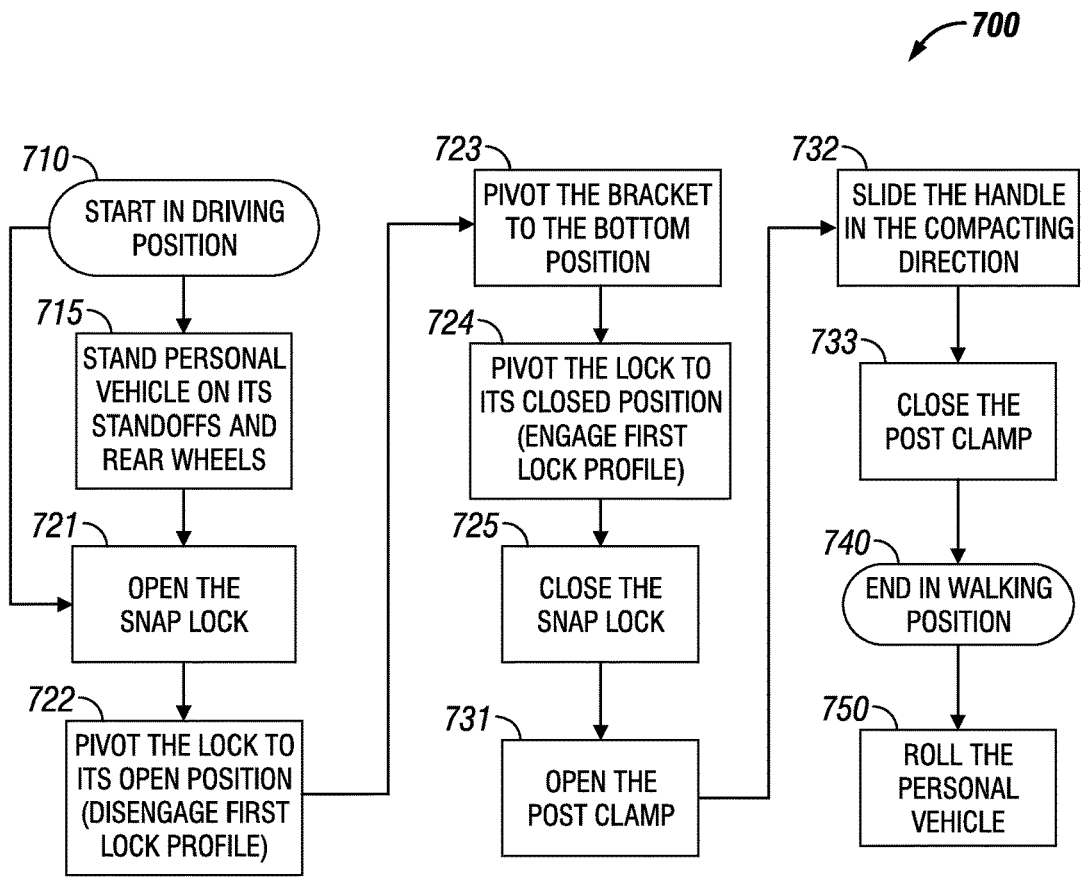

FIG. 11 shows a flow diagram of another method 700 for folding a vehicle. The folding starts 710 with the vehicle in a driving position. The method may include or not include an action 715 of standing the personal vehicle in an upright position on its standoffs and rear wheels. Action 721 in method 700 includes moving the snap lock to the open position to allow movement of the lock with respect to the bracket. The lock is then pivoted from the closed position to the open position in action 722. In action 722, the first lock profile of the lock is disengaged to permit the bracket to be pivoted between a top position and a bottom position. Action 723 in method 700 includes pivoting the bracket from the top position to the bottom position. The lock is then pivoted to the closed position in action 724. In action 724, the second lock profile of the lock is engaged to limit movement of the bracket between the top position and the bottom position. Action 725 in method 700 includes moving the snap lock to the closed position to limit movement of the lock with respect to the bracket. With the bracket in the bottom position and both the lock and snap lock in their respective closed positions, the handle may be adjusted to accommodate the height of a user. Depending on the height of the user, no adjustment may be needed.

The handle may be adjusted using actions 731, 732, and 733. In action 731 of method 700, the post clamp is opened. In the open position, the post clamp allows the handle to slide in a compacting direction in action 732. Then, the post clamp may be closed to limit further sliding of the handle in action 733. With the handle in the compact position and the bracket in the bottom position, the folding ends 740 with the vehicle in the walking position. In the walking position 740, the vehicle may be rolled on its rear wheels. The method is reversible. Therefore, the folding may start with the vehicle in the walking position. The post clamp may be opened 733, the handle may slide in an expanding direction 732, and the post clamp may be closed 731. The snap lock may be opened 725, the lock pivoted to its open position 724, the bracket pivoted to the top position 723, the lock pivoted to the closed position 722, and the snap lock closed 721. The folding may end with vehicle in the driving position. It may be appreciated by one of ordinary skill in the art that certain actions of the methods may be completed in a different order than the order prescribed above.

The features and benefits of the present method may also be used in combination with other methods and apparatuses discussed herein even though not specifically indicated otherwise.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted.

| TABLE OF REFERENCE NUMERALS FOR FIGURES. | |
|---|---|
| 100 | personal vehicle |
| 105 | frame |
| 110 | bottom rod |
| 111 | rear side of bottom rod |
| 112 | front side of bottom rod |
| 115 | top rod |
| 120 | front end |
| 122 | rear end |
| 130 | foot deck |
| 140 | front wheel |
| 150 | rear wheel |
| 160 | standoff |
| 170 | motor |
| 200 | bracket |
| 210A | first bracket profile |
| 210B | second bracket profile |
| 215 | bracket aperture |
| 220 | lock aperture |
| 230 | fork connection |
| 240 | snap lock opening |
| 300 | lock |
| 310A | first lock profile |
| 310B | second lock profile |
| 320 | rod aperture |
| 322 | lock rod |
| 323 | lock rod bolt |
| 324 | handle spring |
| 330 | snap lock |
| 332 | lock spring |
| 334 | lock lever |
| 336 | snap lock aperture |
| 338 | snap lock pin |
| 340 | handle protrusion |
| 342 | handle aperture |
| 350 | lock holder |
| 360 | lock handle |
| 362 | lock arm |
| 400 | handle |
| 410 | first post |
| 415 | first post end |
| 420 | second post |
| 425 | second post end |
| 430 | grip |
| 440 | post clamp |
| 500 | fork assembly |
| 510 | first tube |
| 512 | first end of the first tube |
| 514 | second end of the first tube |
| 520 | second tube |
| 530 | first plate |

-continued

TABLE OF REFERENCE NUMERALS FOR FIGURES.

| | |
|---|---|
| 535 | second plate |
| 540 | first wheel bracket |

What is claimed is:

1. A method for folding a personal vehicle comprising:
providing a frame having a foot deck and a front end;
providing a front wheel;
providing a bracket pivotally connected to the front end of the frame, the bracket having a bottom position at least partially elevationally below the foot deck and a top position at least partially elevationally above the bottom position;
providing a handle connected to the bracket;
providing a lock pivotally connected to and at least partially inside the bracket, the lock having a first lock profile and a second lock profile;
providing a lock holder connected to the bracket;
providing a lock handle having a lock arm, the first lock profile and the second lock profile being positioned on the lock arm;
providing a snap lock connected to the lock handle, the snap lock having a closed and an open position;
engaging the first lock profile with a bottom rod of the frame when the bracket is in the top position;
engaging the snap lock with the lock holder in the closed position and limiting movement of the lock handle with respect to the bracket;
disengaging the first lock profile from the bottom rod of the frame;
pivoting the bracket from the top position to the bottom position, the handle being positioned at least partially elevationally above the foot deck of the frame when the bracket is in the top position, and the handle being positioned at least partially elevationally below the foot deck of the frame when the bracket is in the bottom position;
engaging the second lock profile with the bottom rod of the frame when the bracket is in the bottom position.

2. The method of claim 1, further comprising:
providing a fork assembly connected to the bracket, the fork assembly having a first tube;
providing a grip and a first post of the handle, the grip being positioned at a top end of the handle and the first post being positioned within the first tube; and
sliding the first post within the first tube in one of a compacting direction and an expanding direction, the compacting direction moving the grip of the handle towards to the first tube, and the expanding direction moving the grip of the handle away from the first tube.

3. The method of claim 2, further comprising providing a post clamp having a closed position and an open position, moving the post clamp to the closed position to limit movement of the first post of the handle within the first tube of the fork assembly, and moving the post clamp to the open position to permit the first post of the handle to slide within the first tube.

4. The method of claim 2, further comprising:
providing at least one rear wheel;
providing at least one standoff positioned at a rear end of the frame; and
supporting the folding, personal vehicle in an upright position on a surface when the bracket is in the bottom position and when the at least one standoff is in contact with the surface.

5. The method of claim 4, further comprising:
rolling the folding, personal vehicle on the at least one rear wheel when the bracket is in the bottom position; and
using the grip of the handle to maneuver the folding, personal vehicle.

6. The method of claim 2, wherein the fork assembly includes a second tube and wherein the handle includes a second post positioned within the second tube, the front wheel being positioned between and connected to the first tube and the second tube and the method further comprises:
sliding the second post within the second tube in one of a compacting direction and an expanding direction along with the sliding of the first post within the first tube.

* * * * *